United States Patent [19]

Citta et al.

[11] Patent Number: 4,759,061

[45] Date of Patent: Jul. 19, 1988

[54] TECHNIQUE FOR TOGGLING CODING MODE IN A TELEVISION SIGNAL ENCODER

[75] Inventors: Richard W. Citta, Oak Park; Melvin C. Hendrickson, Elmhurst; Dennis M. Mutzabaugh, Mount Prospect, all of Ill.

[73] Assignee: Zenith Electronics Corporation, Glenview, Ill.

[21] Appl. No.: 14,893

[22] Filed: Feb. 13, 1987

Related U.S. Application Data

[63] Continuation-in-part of Ser. No. 794,199, Nov. 1, 1985, abandoned, and Ser. No. 863,640, May 15, 1986, abandoned.

[51] Int. Cl.[4] .......................................... H04N 7/167
[52] U.S. Cl. ........................................ 380/17; 380/10
[58] Field of Search ............................. 380/10, 17, 20

[56] References Cited

U.S. PATENT DOCUMENTS

| | | | |
|---|---|---|---|
| 4,222,068 | 9/1980 | Thompson | 358/120 |
| 4,308,556 | 12/1981 | Osaka | 380/17 |
| 4,340,906 | 7/1982 | den Toonder et al. | 358/124 |
| 4,369,462 | 1/1983 | Tomizawa et al. | 358/124 |
| 4,447,828 | 5/1984 | den Toonder | 358/118 |
| 4,454,543 | 6/1984 | Lund et al. | 358/124 |
| 4,514,761 | 4/1985 | Merrell et al. | 358/122 |
| 4,679,235 | 7/1987 | Okada et al. | 380/17 |

Primary Examiner—Stephen C. Buczinski
Assistant Examiner—Linda J. Wallace

[57] ABSTRACT

A technique for toggling the coding mode in a television signal encoder comprises establishing a rectangular window defining a relatively small and substantially centrally located portion of the field image intervals of the television signal. The coding mode of the encoder is toggled whenever the APL of the television signal occurring during the window exhibits a change for successive video fields exceeding a predetermined threshold level.

24 Claims, 2 Drawing Sheets

TECHNIQUE FOR TOGGLING CODING MODE IN A TELEVISION SIGNAL ENCODER

BACKGROUND OF THE INVENTION

This application is a continuation-in-part of application Ser. No. 794,199, filed Nov. 1, 1985 abandoned and application Ser. No. 863,640, filed May 15, 1986 abandoned.

This invention relates to video signal coding and concerns apparatus and methods for developing a coding mode control signal which may be used to initiate a change in video coding modes or to switch from a coded or uncoded mode to the opposite mode.

Video signal coding or scrambling is often used in subscription television systems to prevent unauthorized reception and reproduction of pay television signals. One well-known form of video coding involves inverting (i.e. reversing) the polarity of the video component of the televised signal. In order to increase the security of such a system, the video coding is preferably switched from time to time between standard non-inverting and encoded inverting modes. Such mode switching may be effected on a random basis as taught in U.S. Pat. No. 4,222,068 to Thompson but this produces an annoying flicker in the reproduced image due to system non-linearities.

In order to reduce this flicker problem, it has been proposed to switch between modes only during large changes in the picture content of the video signal (such as during scene changes), the thought being that any flicker would be masked by the scene change. Prior art attempts along these lines have involved comparing the average picture levels of entire video fields to detect scene changes and to initiate mode switching in response thereto. U.S. Pat. Nos. 4,340,906 to den Toonder et al, 4,454,543 to Lund et al and 4,447,828 to den Toonder disclose a digital implementation of such a system. It has been found, however, that detecting scene changes based on average picture levels of entire video fields is a relatively insensitive technique which may cause mode switching to occur at an undesirably slow rate.

For example, consider two successive scenes-one of a male figure on a given background and the other of a female figure on the same background. Even though the two scenes are completely distinct, the average picture level of both integrated over an entire field may be nearly the same such that the coding mode of a typical prior art system would not be switched. Similarly, prior art systems will frequently be insensitive to picture changes resulting from motion in the picture and from changes produced by camera panning. Since all such picture changes have the effect of masking flicker resulting from mode switching, it would be desirable to provide a system responsive or sensitive thereto.

OBJECTS OF THE INVENTION

It is therefore a basic object of the present invention to provide an improved technique for switching the coding mode of a television signal based on the picture content thereof.

It is a further object of the invention to provide a method and apparatus for reliably detecting changes in the content of a video signal for generating a coding mode control signal with minimum disturbance to the viewer.

BRIEF DESCRIPTION OF THE DRAWINGS

The features of the invention which are believed to be novel are set forth with particularity in the appended claims. The invention, together with its objects and the advantages thereof, may best be understood by reference to the following description taken in connection with the accompanying drawings in which:

DESCRIPTION OF THE PREFERRED EMBODIMENT

Figure 1:
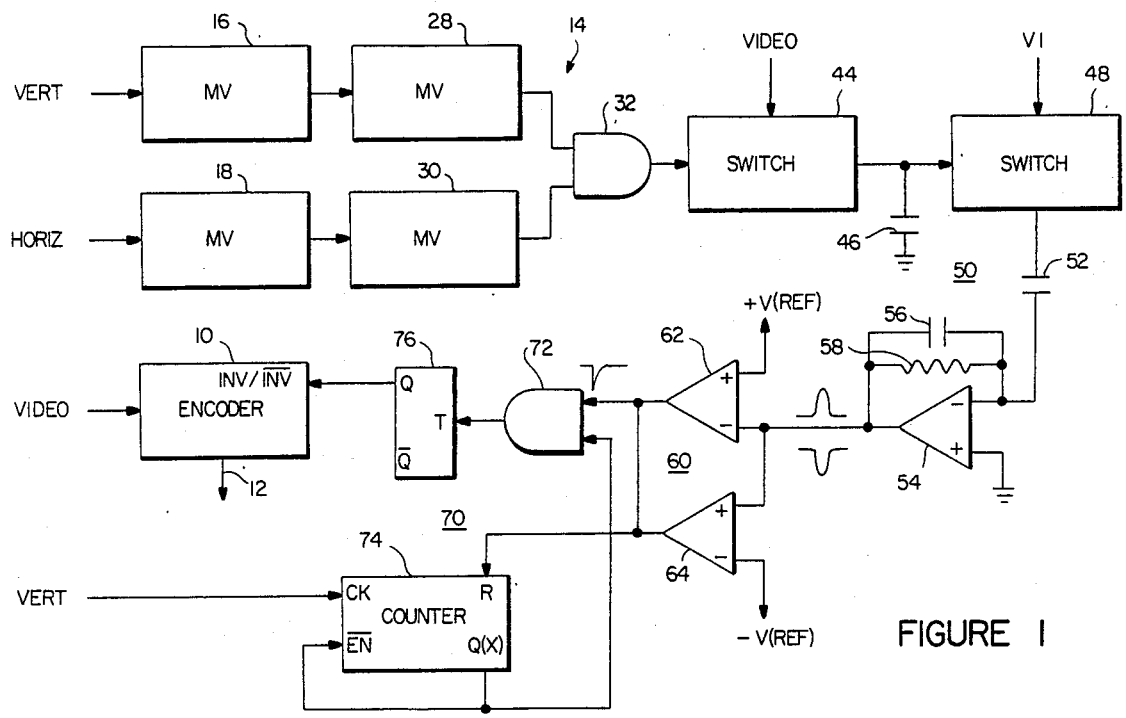
FIG. 1 is a block diagram of one embodiment of the invention.

Referring now to the drawings, FIG. 1 illustrates a preferred embodiment of the present invention for developing a coding mode control signal adapted for toggling the coding mode of a broadcast television signal between two alternate states. More particularly, the developed coding mode control signal is coupled to the INV/$\overline{\text{INV}}$ input of an encoder 10 for toggling the video component of a television signal developed on an output 12 of the encoder between an inverted and a non-inverted state. Encoder 10 is well known in the art and exemplary embodiments thereof may be found in the prior art patents referred to above. It should be understood, however, that the present invention is not limited to toggling the video component between inverted and non-inverted states but, in a broader sense, comprehends alternating or switching between any video coding modes.

Figure 2A:
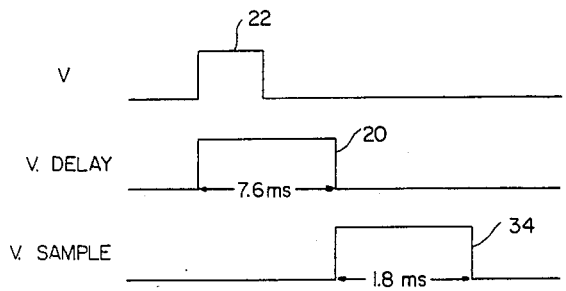
FIGS. 2A and 2B are waveform diagrams illustrating the operation of the circuit of FIG. 1.
Figure 2B:
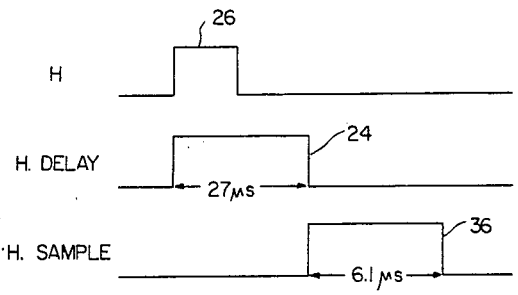

With more particular reference now to FIG. 1, the coding mode control signal is developed by a circuit generally identified by reference numeral 14. Circuit 14 includes a pair of input positive-edge-triggered monostable multivibrators 16 and 18 respectively responsive to the vertical and horizontal synchronization components of the video signal. As illustrated in FIG. 2A, multivibrator 16 preferably has a delay of about 7.6 milliseconds for providing an output vertical delay pulse 20 having a duration of 7.6 milliseconds measured from the positive-going edge of each applied vertical sync signal 22. Multivibrator 18, on the other hand, preferably has a delay of about 27 microseconds for providing an output horizontal delay pulse 24 having a duration of 27 microseconds measured from the positive-going edge of each applied horizontal sync signal 26. The output vertical and horizontal delay pulses 20 and 24 produced by multivibrators 16 and 18 are subsequently applied to respective negative-edge-triggered monostable multivibrators 28 and 30. Multivibrators 28 and 30 preferably have delays of about 1.8 milliseconds and 6.1 microseconds respectively for providing output vertical and horizontal sample pulses 34 and 36 having corresponding durations measured from the negative-going edges of vertical and horizontal delay pulses 20 and 24 as shown in FIGS. 2A and 2B.

Figure 3:
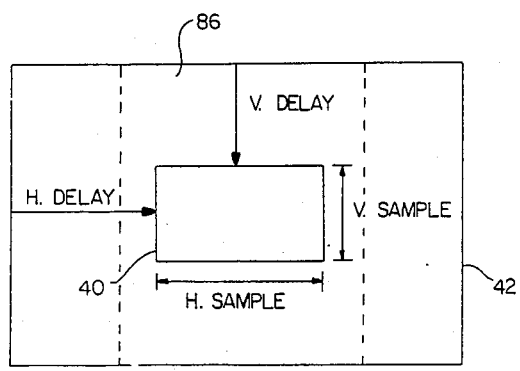
FIG. 3 is a representation of a video field image interval illustrating the principle of the present invention.

The vertical and horizontal sample pulses 34 and 36 produced by multivibrators 28 and 30 respectively are applied to the two inputs of an AND gate 32. The output of AND gate 32 therefore comprises a sample or gating signal defined by coincidence between the vertical and horizontal sample pulses. It will be appreciated that this sample signal corresponds to a portion or window 40 of the field image interval 42 defined by the input sync signals as shown in FIG. 3. More specifically, in accordance with NTSC standards, the field image interval 42, which corresponds to the raster scan pattern produced during each video field in response to the sync signals, has a horizontal dimension of about 52 microseconds and a vertical dimension of about 15.3 milliseconds. Portion 40 defined by the sample signal developed at the output of AND gate 32 represents a rectangular window comprising in a preferred embodiment of the invention, about 1.4% of and substantially centrally disposed within each field image interval 42. In particular, rectangular window 40 has a width of about 6.1 microseconds corresponding to the duration of horizontal sample pulse 36 and a height of about 1.8 milliseconds corresponding to the duration of vertical sample pulse 34. Also, the rectangular window is located about 7.6 milliseconds (corresponding to vertical delay pulse 20) below the top edge of field image interval 42 and about 27 microseconds (corresponding to horizontal delay pulse 24) to the right of the left edge of the field image interval. It will be appreciated that the size and position of window 40 can be adjusted as desired by suitably changing the widths of pulses 20, 24, 34 and 36.

The sample signal described above is applied by AND gate 32 for operating a first switch 44 for coupling the video signal to a signal storage capacitor 46 during window 40 of each field image interval 42. Storage capacitor 46 thereby stores a signal representing the average picture level (APL) of the video signal occurring during the rectangular window 40 of each successive field image interval. These stored signals are coupled by a second switch 48 during the vertical interval following each field to the input of a signal change detector circuit 50.

Change detector circuit 50 includes a storage capacitor 52 coupled between the output of switch 48 and one input of an inverting amplifier 54, the other input of amplifier 54 being coupled to ground. A network comprising the parallel combination of a capacitor 56 and a resistor 58 is connected across amplifier 54. In operation, the APL representive signal developed during each field and stored across capacitor 46 is transfered for storage across capacitor 52 during the following vertical interval. If the thusly transferred signal is different for two successive fields a change signal is developed at the output of amplifier 54, the change signal comprising a positive-going pulse if the change is in a positive direction and a negative-going pulse if the change is in a negative direction. Change detector circuit 50 is therefore effective for continuously comparing the APL of the video signal occurring during rectangular window 40 of field image interval 42 for successive video fields and for generating a change signal reflecting a difference therebetween.

The change signal developed by change detector circuit 50 is coupled to a window comparator 60 comprising a pair of comparators 62 and 64. The change signal is coupled to a first input of each of the comparators 62 and 64, the second input of comparator 62 being coupled to a positive reference voltage and the second input of comparator 64 being coupled to a negative reference voltage. The positive and negative reference voltages are both preferably about 0.3 volts. Thus, whenever the change signal has a threshold value more positive than +0.3 volts or more negative than −0.3 volts a negative output pulse is produced by window comparator 60. This pulse, which represents a change exceeding a predetermined threshold level in the APL of the video signal during rectangular window 40 for successive video fields comprises the coding mode control signal which is coupled to encoder 10 as described below.

Under certain circumstances, the coding mode control signal developed by window comparator 60 may be produced at too rapid a rate resulting in excessive toggling of the coding mode. To prevent this, a timer circuit 70 is interposed between window comparator 60 and encoder 10. Timer circuit 70 comprises an AND gate 72, one input of which receives the mode control signal from window comparator 60, and a counter 74. AND gate 72 is enabled in response to the Q(x) output of counter 74 for coupling the mode control signal to the toggle input of a flip-flop 76 whose Q output controls the state of encoder 10. Counter 74 includes a reset (R) input coupled to the output of window comparator 60, a clock (CK) input coupled for receiving vertical sync and an enable input (EN) coupled to the Q(x) output of the counter.

In operation, assume that a coding mode control signal has not been developed by comparator 60 for some time such that counter 74 is disabled in response to its Q(x) output being high. The next coding mode control signal developed by comparator 60 will therefore be coupled by enabled AND gate 72 for toggling flip-flop 76 thereby changing the state of encoder 10. At the same time, the coding mode control signal resets counter 74 causing its Q(x) output to go low. This disables AND gate 72 preventing it from coupling coding mode control pulses to flip-flop 76. The low Q(x) output also enables the counter which begins counting vertical pulses. After a sufficient number of vertical pulses have been counted, the Q(x) output of the counter will again go high enabling AND gate 72 and disabling the counter. As a result, a minimum time interval, preferably about two seconds, has been established between mode changes of encoder 10.

Thus, in accordance with the foregoing, the coding mode control signal coupled to flip-flop 76 will toggle encoder 10 for reversing the polarity of the video signal at the output 12 of encoder 10 whenever the APL of the video signal occurring during rectangular window 40 is characterized by a change exceeding a predetermined threshold for two successive video fields (assuming that the previous coding mode control signal did not occur within the delay interval established by counter 74). It has been found that due to the relatively small size and substantially central location of rectangular window 40, the circuit 14 is much more sensitive to changes in video content than systems comparing APL's of entire video fields. Thus, mode change signals are produced in response to scene changes even though the APL of the entire field may not change appreciably such as when the video is characterized by motion or camera panning.

Figure 4:
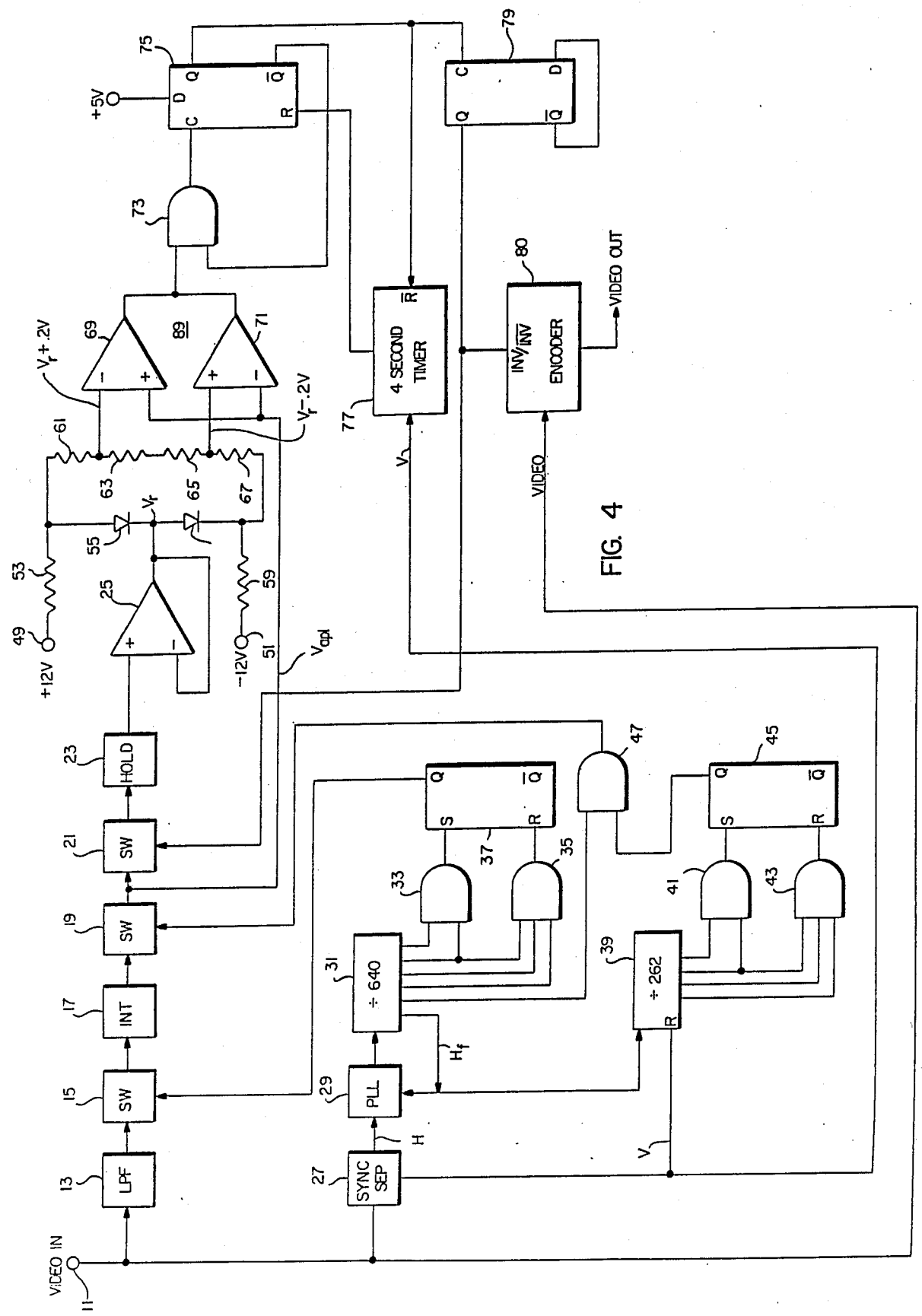
FIG. 4 is a block diagram of another embodiment of the invention.

FIG. 4 shows another embodiment of the invention which utilizes a larger area than that previously disclosed, as well as a simpler technique for developing a sampling signal which results in improved correlation between generation of mode change signals and scene changes of a character sufficient to mask decoding equipment deficiencies. Specifically, the window is significantly wider and covers the full vertical extent of the video display and comprises approximately 18% of the video display. Yet the system is substantially insensitive to vertical movement in the sampled scene. The embodiment shown in FIG. 4 uses a baseband encoding system, in particular, a baseband video inversion system. The invention, however, will be seen to be applicable to other types of television encoding systems, such as RF systems including RF sync suppression.

Referring to FIG. 4, a standard television video input signal, i.e., one that is complete with synchronizing signal information, is supplied to an input terminal 11 where it is coupled; to a low pass filter 13, having a cut-off frequency around 10 KHz; to the input of a sync signal separator 27; and to the video input of an encoder 80. The output of low pass filter 13 is supplied to a switch 15 for controlling passage of the video input signal to an integrating circuit 17. As will be seen, switch 15 is operated to pass a portion or sample of the video signal to integrator 17 during each horizontal line. The output of integrator 17 is coupled to another switch 19 which is controlled on a field basis for coupling a signal representative of the average video or picture level over a full field of sampled intervals to a "window" comparator 89 (comprising a pair of operational amplifiers 69 and 71). Switch 19 is also coupled to a switch 21 which, when it operates, supplies a voltage, representative of the average picture level, to a hold circuit 23 which, in turn, is coupled to another amplifier 25. The output of amplifier 25 is connected to the junction of a resistor-diode network that is coupled between a pair of voltage terminals 49 and 51 connected to +12 V and −12 V, respectively. A resistor 53, a diode 55, a diode 57 and a resistor 59 make up the series circuit connected between terminals 49 and 51, respectively. Coupled across diodes 55 and 57 is a series connection of resistors 61, 63, 65 and 67 for developing a fixed percentage of the potential developed across the diodes. The voltage at the junction of resistors 61 and 63 is supplied to the negative input of amplifier 69 and the voltage at the junction of resistors 65 and 67 is supplied to the positive input of amplifier 71. As mentioned previously, the output of switch 19 is supplied to the remaining terminals of amplifiers 69 and 71, thus completing the signal connections to the window comparator 89. The outputs of the amplifiers in window comparator 89 are connected together and supply one input of a two-input AND gate 73.

The output of amplifier 25 is at a potential Vr and resistors 61, 63, 65 and 67 are selected such that the input to amplifier 69 is Vr+0.2 volt and the input to amplifier 71 is Vr−0.2 volt. Thus the window comparator provides a plus and minus 0.2 volt differential about reference potential Vr. The other inputs of amplifiers 69 and 71 are supplied with a voltage Vapl, representing the average picture level of one field of the sampled portion of the video display. The input to AND 73 is a logic 0 when Vapl is within the range of Vr±0.2 volt and a logic 1 when Vapl is outside of that range. As will be seen, Vr is derived from the average picture level and is periodically updated with changes in the average picture level of the sampled portion of the video display.

Sync separator 27 functions to apply horizontal sync pulses to a phase locked loop (PLL) circuit 29 and vertical sync pulses to the reset terminal of a counter 39 and to a four-second timer 77. PLL 29 includes a voltage controlled oscillator that operates at a free-running frequency of about 10 MHz whose output is coupled to a divide-by-640 counter 31. Counter 31 has a plurality of output leads that are coupled in different combinations to a pair of AND gates 33 and 35, for triggering the AND gates at specific counts and a feedback lead coupled to PLL 29 for locking up PLL 29 at the horizontal frequency of the television signal. This horizontal lock frequency is also applied to an input of divide-by-262 counter 39. The connections of AND gates 33 and 35 to the S and R inputs, respectively, of a flip-flop 37 results in a positive sampling signal pulse being developed at the Q terminal of flip-flop 37 during a portion of each horizontal line in a television signal. The position and duration of the sampling pulses are defined by counting the 100 nanosecond pulses applied to counter 31.

In the preferred embodiment, the sampling pulse is about 12 microseconds in duration and is centered in the video portion of each horizontal line. The sampling pulse is supplied from the Q terminal of flip-flop 37 to switch 15 which operates to pass the video information during the duration of the sampling pulse to integrator 17. Another output from counter 31 is applied to one input of a two input AND gate 47, the output of which feeds switch 19. This output is activated at a vertical rate and operates switch 19 to couple the average picture level voltage developed by integrator 17 during each field to window comparator 89. Divide-by-262 counter 39 is reset during every vertical field by the vertical sync pulse signal on its reset terminal and has a plurality of outputs which supply a pair of AND gates 41 and 43 which, in turn, feed the S and R terminals, respectively, of another flip-flop 45 whose Q output is coupled to the other input of AND 47. This circuit operates in the same manner as that previously described and develops a switching pulse that is approximately 36 microseconds in duration for each vertical field (precisely, for each 262 horizontal lines). It is during occurrence of this 36 microsecond duration pulse that the voltage developed across integrator 17 is applied to window comparator 89.

Returning to AND 73, its output is coupled to the clock input of a D flip-flop 75, the D terminal of which is supplied with +5 volt DC, the Q terminal of which is coupled to the clock input of another flip-flop 79, and to four-second timer 77, the $\overline{Q}$ terminal of which is returned to the other input of AND 73 and the R terminal of which is connected to timer 77. The D and $\overline{Q}$ terminals of flip-flop 79 are connected together and the Q terminals of flip-flop 79 are connected together and the Q terminal of flip-flop 79 is supplied to the INV/$\overline{INV}$ terminal of encoder 80 and to switch 21. Flip-flops 75 and 79 and timer 77 are provided to preclude a coding mode change control signal within four seconds of a previous coding mode change control signal and to periodically update the reference voltage Vr for window comparator 89.

Assume there is no input signal at AND 73. In this condition Q of flip-flop 75 is low, $\overline{Q}$ is high and AND 73 is enabled. If the other input of AND 73 goes high due to detection of a proper signal by window comparator 89, C of flip-flop 75 is clocked, driving Q high. This resets timer 77 to begin counting and, by applying a high logic level to terminal C of flip-flop 79, results in D and Q of 79 going low and Q going high to switch encoder 80 and operate switch 21. Switch 21 couples the new Vapl to hold circuit 23. Amplifier 25 develops a new value of reference potential Vr. At this time, AND 73 is disabled since one of it inputs is at a low logic level. When timer 77 times out after four seconds, it resets flip-flop 75 to drive $\overline{Q}$ low and Q high to enable AND 73. Flip-flop 79 is not affected since its C input is only triggered by the positive-going edges of signal pulses. Consequently, the Q output of flip-flop 79 is not changed and no mode switching occurs in encoder 80. It should be noted that Vapl is continuously applied as one input to window comparator 89 and is measured against Vr to determine whether a sufficient change in average picture level (in the sampled area) has occurred.

In FIG. 3, the dashed line rectangle indicates the sampled area 86 of the FIG. 4 embodiment. It will be noted that sampled area 86 embodies a significantly larger portion of the video display then area 40 and importantly, is only sensitive to changes in the horizontal direction since a full vertical portion is sampled. The arrangement has been found to produce a very high degree of correlation between mode switching and average picture level changes in the sampled area that occur during scene changes such that video flicker is masked. The vertical format used in this embodiment of the invention optimizes mode control switching by requiring only a small average picture level change to effect switching while sampling in an area that essentially does not yield that small average picture level change except when a large picture change or scene change occurs. This is generally accomplished by discriminating against vertical motion.

While particular embodiments of the invention have been shown and described, it will be apparent to those skilled in the art that modifications thereof may be made without departing from the invention and the invention is limited only as defined in the appended claims.

I claim:

1. A method for developing a coding mode control signal for changing the coding mode of a television signal encoder, wherein the television signal is composed of a plurality of periodically recurring field image intervals defined by vertical and horizontal rate components, comprising the steps of:
defining a window comprising a relatively small portion of said field image intervals;
detecting a change in the average picture level of the television signal occurring during said window for successive field image intervals; and
developing said coding mode control signal in response to said detected change exceeding a predetermined threshold.

2. The method of claim 1 wherein said window comprises less than about 2% of said field image interval and is substantially centrally located with respect thereto.

3. The method of claim 1 wherein said detecting step is preformed between successive field image intervals.

4. The method of claim 1 wherein said developing step comprises developing said coding mode control signal in response to said detected change being more positive than a predetermined positive threshold or more negative than a predetermined negative threshold.

5. The method of claim 1 wherein said window comprises a full vertical window.

6. The method of claim 5 wherein said full vertical window comprises about 18% of said field image intervals and is centrally located with respect thereto.

7. The method of claim 6 wherein said detecting step is performed between successive field image intervals.

8. A method for developing a coding mode control signal for toggling the coding mode of a television encoder, wherein the television signal is composed of a plurality of periodicaly recurring field image intervals defined by vertical and horizontal rate components, comprising the steps of:
defining a full vertical window comprising a portion of said field image intervals;
detecting a change in the average picture level of the television signal occurring during said full vertical window for successive field image intervals; and
developing said coding mode control signal in response to said detected change exceeding a predetermined threshold.

9. Apparatus for developing a coding mode control signal for changing the coding mode of a television signal encoder, wherein the television signal is composed of a plurality of periodically recurring field image intervals defined by vertical and horizontal rate components comprising:
means responsive to said vertical and horizontal rate components for developing a sampling signal defining a window comprising a relatively small portion of said field image intervals;
means responsive to said sampling signal for detecting a change in the average picture level of said television signal occurring during said window for successive field image intervals; and
means responsive to said detected change exceeding a predetermined threshold for developing said coding mode control signal.

10. Apparatus according to claim 9 wherein the window defined by said sampling signal comprises less than about 2% of said field image intervals and is substantially centrally located with respect thereto.

11. Apparatus according to claim 9 wherein said means for developing said sampling signal comprises means responsive to each of said vertical rate components for developing a delayed vertical sample signal, means responsive to each of said horizontal rate components for developing a delayed horizontal sample signal and means for developing said sampling signal in response to coincidence between said delayed vertical and horizontal sampling signals.

12. Apparatus according to claim 11 wherein said means for detecting comprises:
signal storage means responsive to said sampling signal for storing a signal representing the average picture level of the television signal occurring during the window of the respective field image interval; and
comparison means responsive to said vertical rate components for comparing the stored signals for successive field image intervals and for developing a control signal reflecting the difference therebetween.

13. Apparatus according to claim 12 wherein said coding mode control signal developing means comprises means responsive to said control signal being characterized by a positive level exceeding a predetermined positive threshold or a negative level exceeding a predetermined negative threshold for developing said coding made control signal.

14. Apparatus according to claim 9 wherein said window comprises a full vertical window.

15. Apparatus according to claim 14 wherein said window comprises about 18% of said field image intervals and is centrally located with respect thereto.

16. The apparatus of claim 15, wherein said means for developing said sampling signal comprises counting means responsive to each of said horizontal rate components for developing a delayed horizontal sample signal.

17. The apparatus of claim 16, wherein said means for detecting comprises:
    signal storage means responsive to said sampling signal for storing a signal representing the average picture level of the television signal occurring during said full vertical window of the respective field image intervals; and
    comparison means responsive to said vertical rate components for comparing the stored signals for successive field image intervals and for developing a control signal reflecting the difference therebetween.

18. The apparatus of claim 17 further including timer means responsive to a sampling signal exceeding said predetermined threshold for inhibiting development of said control signal for a predetermined time period.

19. The apparatus of claim 18, wherein said timer means is driven by said vertical rate components and wherein said predetermined time period is about four seconds.

20. Apparatus for developing a coding mode control signal for changing the coding mode of a television signal encoder, wherein the television signal is composed of a plurality of periodically recurring field image intervals defined by vertical and horizontal rate components, comprising:
    means responsive to said vertical and horizontal rate components for developing a sampling signal defining a window comprising less than about 2% of each of said field image intervals and having a substantially central location with respect thereto;
    means responsive to said sampling signal for detecting a change in the average picture level of said television signal occurring during said window for successive field image intervals; and
    means responsive to said detected change exceeding a predetermined threshold for developing said coding mode control signal.

21. Apparatus according to claim 20 wherein said detecting means comprises means for storing a signal representing the average picture level of the television signal occurring during said window for a given field image interval and for comparing said stored signal with a signal representing the average picture level of the television signal occurring during said window for the succeeding field image interval for detecting a change therebetween.

22. Apparatus according to claim 21 wherein said detecting means comprises means for comparing said average picture level representative signals in a time interval between said given and succeeding field image intervals.

23. Apparatus according to claim 22 wherein said coding mode control signal developing means comprises means for developing a predetermined positive threshold and a predetermined negative threshold and means for developing said coding mode control signal in response to said detected change being more positive than said positive threshold or more negative than said negative threshold.

24. Apparatus for developing a coding mode control signal for toggling the coding mode of a television signal encoder, wherein the television signal is composed of a plurality of periodically recurring field image intervals defined by vertical and horizontal rate components comprising:
    counting means responsive to said vertical and horizontal rate components for developing a delayed horizontal sampling signal defining a centrally located full vertical window comprising approximately 18% of said field image intervals;
    integrator means responsive to said sampling signal for detecting a change in the average picture level of said television signal occurring during said full vertical window for successive field image intervals;
    means for developing a reference signal representative of the average picture level of said television signal occurring during said full vertical window; and
    means responsive to said detected change exceeding a predetermined threshold about said reference signal for developing said coding mode control signal.

* * * * *